US012688321B2

(12) United States Patent
Mishina et al.

(10) Patent No.: US 12,688,321 B2
(45) Date of Patent: Jul. 21, 2026

(54) SECURE CLUSTER CALCULATION SYSTEM, SECURE CLUSTER CALCULATION APPARATUS, SECURE CLUSTER CALCULATION METHOD, AND PROGRAM

(71) Applicant: NTT, Inc.

(72) Inventors: Ibuki Mishina, Tokyo (JP); Dai Ikarashi, Tokyo (JP); Koki Hamada, Tokyo (JP); Ryo Kikuchi, Tokyo (JP)

(73) Assignee: NTT, Inc., Tokyo (JP)

( * ) Notice: Subject to any disclaimer, the term of this patent is extended or adjusted under 35 U.S.C. 154(b) by 49 days.

(21) Appl. No.: 18/726,808

(22) PCT Filed: Jan. 11, 2022

(86) PCT No.: PCT/JP2022/000520
§ 371 (c)(1),
(2) Date: Jul. 4, 2024

(87) PCT Pub. No.: WO2023/135636
PCT Pub. Date: Jul. 20, 2023

(65) Prior Publication Data
US 2025/0068756 A1 Feb. 27, 2025

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

2020/0177633 A1* 6/2020 Shivamoggi ...... G06F 18/23213

OTHER PUBLICATIONS

Hartigan et al. (1979) "Algorithm AS 136: A K-Means Clustering Algorithm", Journal of the Royal Statistical Society, Series C (Applied Statistics), vol. 28, No. 1, pp. 100-108.
Vaidya et al. (2003) "Privacy-preserving k-means clustering over vertically partitioned data", In Proceedings of the ninth ACM SIGKDD international conference on Knowledge discovery and data mining, pp. 206-215.

* cited by examiner

*Primary Examiner* — Brandon Hoffman

(57) ABSTRACT

Provided is a technology for performing secure computation of a k-means method with high accuracy while keeping data secure. The technology includes: centroid table initialization means that sets a table including a set of a share of a cluster ID j and a share of a centroid of a cluster ID j as a j-th record as an initial value of a centroid table; distance table computation means that computes a distance table including a set of a share of a data ID i, the share of the cluster ID j, a share of a distance $d_{ij}$ between data of the data ID i and the centroid of the cluster ID j as an M(j−1)+i-th record; cluster ID table computation means that computes a cluster ID table including a set of the share of the data ID i and a share of a cluster ID k(i) of the cluster to which the data of the data ID i belongs as an i-th record; and centroid table computation means that computes the centroid table.

6 Claims, 10 Drawing Sheets

(A) TABLE THAT IS TARGET OF groupBySum OPERATION

| KEY ATTRIBUTE | VALUE ATTRIBUTE 1 | VALUE ATTRIBUTE 2 |
|---|---|---|
| [[3]] | [[5]] | [[3]] |
| [[1]] | [[2]] | [[5]] |
| [[1]] | [[3]] | [[2]] |
| [[2]] | [[1]] | [[4]] |
| [[3]] | [[4]] | [[1]] |

(B) TABLE INDICATING RESULTS OF groupBySum OPERATION

| KEY ATTRIBUTE | VALUE ATTRIBUTE 1 | VALUE ATTRIBUTE 2 |
|---|---|---|
| [[1]] | [[5]] | [[7]] |
| [[2]] | [[1]] | [[4]] |
| [[3]] | [[9]] | [[4]] |

(A) TABLE THAT IS TARGET OF groupBySum OPERATION

| KEY ATTRIBUTE | VALUE ATTRIBUTE 1 | VALUE ATTRIBUTE 2 |
|---|---|---|
| [[3]] | [[5]] | [[3]] |
| [[1]] | [[2]] | [[5]] |
| [[1]] | [[3]] | [[2]] |
| [[2]] | [[1]] | [[4]] |
| [[3]] | [[4]] | [[1]] |

(B) TABLE INDICATING RESULTS OF groupBySum OPERATION

| KEY ATTRIBUTE | VALUE ATTRIBUTE 1 | VALUE ATTRIBUTE 2 |
|---|---|---|
| [[1]] | [[5]] | [[7]] |
| [[2]] | [[1]] | [[4]] |
| [[3]] | [[9]] | [[4]] |

Fig. 1

(A) TABLE THAT IS TARGET OF groupByCount OPERATION

| KEY ATTRIBUTE | VALUE ATTRIBUTE 1 | VALUE ATTRIBUTE 2 |
|---|---|---|
| [[3]] | [[5]] | [[3]] |
| [[1]] | [[2]] | [[5]] |
| [[1]] | [[3]] | [[2]] |
| [[2]] | [[1]] | [[4]] |
| [[3]] | [[4]] | [[1]] |

(B) TABLE INDICATING RESULTS OF groupByCount OPERATION

| KEY ATTRIBUTE | VALUE ATTRIBUTE 1 | VALUE ATTRIBUTE 2 |
|---|---|---|
| [[1]] | [[2]] | [[2]] |
| [[2]] | [[1]] | [[1]] |
| [[3]] | [[2]] | [[2]] |

Fig. 2

CLUSTER ID TABLE

| DATA ID | CLUSTER ID |
|---------|------------|
| [[1]]   | [[2]]      |
| [[2]]   | [[2]]      |
| [[3]]   | [[1]]      |
| [[4]]   | [[3]]      |
| [[5]]   | [[1]]      |

Fig. 3

DATA TABLE

| DATA ID | DATA |
|---------|------|
| [[1]] | $([[x_{11}]], ..., [[x_{1N}]])$ |
| [[2]] | $([[x_{21}]], ..., [[x_{2N}]])$ |
| [[3]] | $([[x_{31}]], ..., [[x_{3N}]])]$ |
| [[4]] | $([[x_{41}]], ..., [[x_{4N}]])$ |
| [[5]] | $([[x_{51}]], ..., [[x_{5N}]])$ |

Fig. 4

CENTROID TABLE

| CLUSTER ID | CENTROID |
|---|---|
| [[1]] | $([[c_{11}]], \ldots, [[c_{1N}]])$ |
| [[2]] | $([[c_{21}]], \ldots, [[c_{2N}]])$ |
| [[3]] | $([[c_{31}]], \ldots, [[c_{3N}]])]$ |

Fig. 5

DISTANCE TABLE

| DATA ID | CLUSTER ID | DISTANCE |
|---------|------------|----------|
| [[1]] | [[1]] | $[[d_{11}]]$ |
| [[2]] | [[1]] | $[[d_{21}]]$ |
| [[3]] | [[1]] | $[[d_{31}]]$ |
| [[4]] | [[1]] | $[[d_{41}]]$ |
| [[5]] | [[1]] | $[[d_{51}]]$ |
| [[1]] | [[2]] | $[[d_{12}]]$ |
| [[2]] | [[2]] | $[[d_{22}]]$ |
| [[3]] | [[2]] | $[[d_{32}]]$ |
| [[4]] | [[2]] | $[[d_{42}]]$ |
| [[5]] | [[2]] | $[[d_{52}]]$ |
| [[1]] | [[3]] | $[[d_{13}]]$ |
| [[2]] | [[3]] | $[[d_{23}]]$ |
| [[3]] | [[3]] | $[[d_{33}]]$ |
| [[4]] | [[3]] | $[[d_{43}]]$ |
| [[5]] | [[3]] | $[[d_{53}]]$ |

Fig. 6

100$_i$ SECURE CLUSTER
COMPUTATION DEVICE

SECURE CLUSTER CALCULATION SYSTEM, SECURE CLUSTER CALCULATION APPARATUS, SECURE CLUSTER CALCULATION METHOD, AND PROGRAM

CROSS-REFERENCE TO RELATED APPLICATIONS

This application is a U.S. 371 Application of International Patent Application No. PCT/JP2022/000520, filed on 11 Jan. 2022, the disclosure of which is hereby incorporated herein by reference in its entirety.

TECHNICAL FIELD

The present invention relates to a secure computation technology, and in particular, to a technology of performing secure computation of the k-means method.

BACKGROUND ART

As a technology for classifying a plurality of pieces of data, there is a technology (hereinafter, referred to as a clustering technology) for classifying similar pieces of data into one cluster. Examples of the clustering technology include the k-means method described in Non Patent Literature 1. As a conventional method for secure computation of the k-means method, there is a method described in Non Patent Literature 2.

The secure computation is a method of obtaining an operation result of a designated operation without restoring an encrypted numerical value (for example, see Reference Non Patent Literature 1). In the method of Reference Non Patent Literature 1, encryption of distributing a plurality of pieces of information capable of restoring numerical values to three secure computation devices is performed, and thus the results of addition/subtraction, constant addition, multiplication, constant multiplication, logical operation (NOT, logical product, logical sum, exclusive logical sum), data format conversion (integer and binary number), and the like can be held in a state of being distributed to the three secure computation devices without restoring the numerical values, that is, in an encrypted state. In general, the distribution number is not limited to three and may be W (W is a predetermined constant of three or more), and a protocol that achieves secure computation by cooperative calculation by W secure computation devices is called a multi-party protocol.

(Reference Non Patent Literature 1: Koji Chida, Koki Hamada, Dai Igarashi, Katsumi Takahashi, "Keiryo kensho kano 3 party hitoku kansu keisan no saiko (in Japanese) (A Three-Party Secure Function Evaluation with Lightweight Verifiability Revisited)", In CSS, 2010.)

CITATION LIST

Non Patent Literature

Non Patent Literature 1: John A Hartigan and Manchek A Wong, "Algorithm AS 136: A K-Means Clustering Algorithm", Journal of the Royal Statistical Society. Series C (Applied Statistics), Vol. 28, No. 1, pp. 100-108, 1979.

Non Patent Literature 2: Jaideep Vaidya and Chris Clifton, "Privacy-preserving k-means clustering over vertically partitioned data", In Proceedings of the ninth ACM SIGKDD international conference on Knowledge discovery and data mining, pp. 206-215, 2003.

SUMMARY OF INVENTION

Technical Problem

However, the method described in Non Patent Literature 2 has a problem of computation accuracy that a result is different from a result obtained when computation is performed in plain text in order to perform approximate computation on an object that is difficult to compute in an encrypted state, and a problem of safety that data is decrypted and computed in the middle of computation.

Therefore, an object of the present invention is to provide a technology for performing secure computation of the k-means method with high accuracy while keeping data secure.

Solution to Problem

An aspect of the present invention is a secure cluster computation system having M (M is an integer of 1 or more) as the number of data, K (K is an integer of 1 or more) as the number of clusters, N (N is an integer of 1 or more) as a dimension of data, and $(x_{i1}, \ldots, x_{iN})$ (i=1, ..., M) as data of the data ID i, including three or more secure cluster computation devices, and configured to calculate a share $[[k(i)]]$ of a cluster ID k(i) (where k(i) satisfies $1 \leq k(i) \leq K$) of a cluster to which the data of the data ID i belongs from shares $([[x_{i1}]], \ldots, [[x_{iN}]])$ (i=1, ..., M) of M pieces of data $(x_{i1}, \ldots, x_{iN})$, in which a table that includes a data ID and a cluster ID of a cluster to which data of the data ID belongs as attributes (hereinafter, referred to as a data ID attribute and a cluster ID attribute) is set as a cluster ID table, a table that includes a data ID and data of the data ID as attributes (hereinafter, referred to as a data ID attribute and a data attribute) is set as a data table, a table that includes a cluster ID and a centroid of a cluster of the cluster ID as attributes (hereinafter, referred to as a cluster ID attribute and a centroid attribute) is set as a centroid table, and a table that includes a data ID, a cluster ID, and a distance between data of the data ID and a centroid of a cluster of the cluster ID as attributes (hereinafter, referred to as a data ID attribute, a cluster ID attribute, and a distance attribute) is set as a distance table, the data table includes a set of a share $[[i]]$ of the data ID i and the share $([[x_{i1}]], \ldots, [[x_{iN}]])$ of the data $(x_{i1}, \ldots, x_{iN})$ of the data ID i as the i-th record (i=1, ..., M), the secure cluster computation system includes: centroid table initialization means that sets a table including a set of a share $[[j]]$ of a cluster ID j and a share $([[c_{j1}]], \ldots, [[c_{jN}]])$ of a centroid $(c_{j1}, \ldots, c_{jN})$ of the cluster ID j (where the shares are computed by a predetermined method) as the j-th record (j=1, ..., K) as an initial value of the centroid table; distance table computation means that uses the data table and the centroid table to compute a distance table including a set of the share $[[i]]$ of the data ID i, the share $[[j]]$ of the cluster ID j, a share $[[d_{ij}]]$ of a distance $d_{ij}$ between the data $(x_{i1}, \ldots, x_{iN})$ of the data ID i and the centroid $(c_{j1}, \ldots, c_{jN})$ of the cluster ID j as an M(j-1)+i-th record (i=1, ..., M, j=1, ..., K); cluster ID table computation means that computes a cluster ID table including a set of the share $[[i]]$ of the data ID i and the share $[[k(i)]]$ of the cluster ID k(i) of the cluster to which the data of the data ID i belongs as the i-th record (i=1, . . . , M) using the distance table; and centroid table computation means that computes the centroid table using the data table and the cluster ID table.

Advantageous Effects of Invention

According to the present invention, it is possible to perform secure computation of the k-means method with high accuracy while keeping data secure.

BRIEF DESCRIPTION OF DRAWINGS

FIG. 1 is a diagram illustrating a situation of groupBySum operation.

FIG. 2 is a diagram illustrating a situation of groupBy-Count operation.

FIG. 3 is a diagram illustrating an example of a cluster ID table.

FIG. 4 is a diagram illustrating an example of a data table.

FIG. 5 is a diagram illustrating an example of a centroid table.

FIG. 6 is a diagram illustrating an example of a distance table.

DESCRIPTION OF EMBODIMENTS

Figure 7:
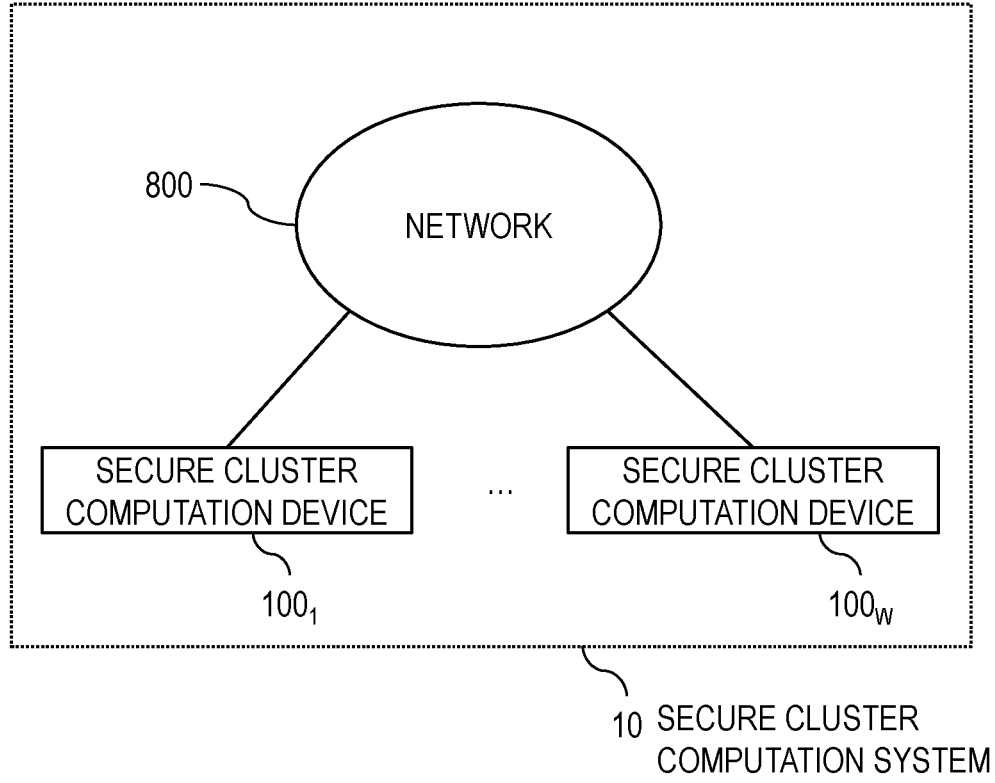
FIG. 7 is a block diagram illustrating a configuration of a secure cluster computation system 10.

Hereinafter, an embodiment of the present invention will be described in detail. Note that components having the same functions are denoted by the same reference numerals, and redundant description will be omitted.

Prior to the description of each embodiment, a notation method in the present specification will be described.

^(caret) represents a superscript. For example, $x^{y^z}$ represents that $y^z$ is a superscript for x, and $x_{y^z}$ represents that $y^z$ is a subscript for x. Furthermore, _(underscore) represents a subscript. For example, $x^{y_z}$ represents that $y_z$ is a superscript for x, and $x_{y_z}$ represents that $y_z$ is a subscript for x.

A superscript "^" or "~" such as ^x or ~x for a certain letter x would normally be placed directly above "x", but is written as ^x or ~x due to restrictions on notation in the specification.

TECHNICAL BACKGROUND

<<Secure Computation>>

The secure computation in the invention of the present application is constructed by a combination of existing secure computation operations. The operations necessary for the secure computation are concealment, addition, subtraction, multiplication, division, logical operation (NOT, logical product, logical sum, exclusive logical sum), comparison operation (=, <, >, ≤, ≥), secure sorting, secure unique check, and Group-by operation. Hereinafter, some operations including the notation will be described.

[Concealment]

It is assumed that is a value (hereinafter, referred to as a share of x) obtained by concealing x by secure distribution.

Any known method can be used as the secure distribution method. For example, the Shamir's secure distribution on GF $(2^{61}-1)$ and the duplication secure distribution on $Z_2$ can be used. It is to be noted that because double brackets are typically used in patent amendments to delete the subject matter between the double brackets, the claims are written to use double parenthesis and instead of double brackets used throughout the specification. Therefore, double parenthesis within the claims mean the same as double brackets described herein.

A plurality of secure distribution methods may be used in combination in one algorithm. In this case, mutual conversion is appropriately performed.

For the N-dimensional vector $\vec{x}=(x_1, \ldots, x_N)$, $[[\vec{x}]]=([[x_1]], \ldots, [[x_N]])$ is set. That is, $[[\vec{x}]]$ is a vector having the share $[[x_n]]$ of the n-th element $x_n$ of $\vec{x}$ as the n-th element. As similar to this, also for the M×N matrix $A=(a_{m,\,n})$ (1≤m≤M, 1≤n≤N), $[[A]]$ is set as a matrix having the share $[[a_{m,\,n}]]$ of the (m, n) th element $a_{m,\,n}$ of A as the (m, n)-th element.

x is referred to as a plaintext of $[[x]]$.

As a method of obtaining $[[x]]$ from x (concealment) and a method of obtaining x from $[[x]]$(restoration), specifically, there are methods described in Reference Non Patent Literature 1 and Reference Non Patent Literature 2.

(Non Patent Literature 2: Shamir, A., "How to share a secret", Communications of the ACM, Vol. 22, No. 11, pp. 612-613, 1979.)

[Addition, Subtraction, Multiplication, and Division]

The addition $[[x]]+[[y]]$ by secure computation uses $[[x]]$, $[[y]]$ as inputs and outputs $[[x+y]]$. The subtraction $[[x]]-[[y]]$ by secure computation uses $[[x]]$, $[[y]]$ as inputs, and outputs $[[x-y]]$. The multiplication $[[x]]\times[[y]]$(sometimes represented as mul($[[x]], [[y]]$)) by secure computation uses $[[x]]$, $[[y]]$ as inputs, and outputs $[[x\times y]]$. The division $[[x]]/[[y]]$(sometimes represented as div($[[x]], [[y]]$)) by the secure computation uses $[[x]]$, $[[y]]$ as inputs, and outputs $[[x/y]]$.

As specific methods of addition, subtraction, multiplication, and division, there are methods described in Reference Non Patent Literature 3 and Reference Non Patent Literature 4.

(Reference Non Patent Literature 3: Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1988.)

(Reference Non Patent Literature 4: Gennaro, R., Rabin, M. O. and Rabin, T., "Simplified VSS and fast-track multiparty computations with applications to threshold cryptography", Proceedings of the seventeenth annual ACM symposium on Principles of distributed computing, ACM, pp. 101-111, 1998.)

For the share $[[\vec{x}]]=([[x_1]], \ldots, [[x_N]])$ of the N-dimensional vector $\vec{x}=(x_1, \ldots, x_N)$ and the share $[[\vec{y}]]=([[y_1]], \ldots, [[y_N]])$ of the N-dimensional vector $\vec{y}=(y_1, \ldots, y_N)$, the division $[[\vec{x}]]/[[\vec{y}]]$ by the secure computation is set as $[[\vec{x}/\vec{y}]]=([[x_1/y_1]], \ldots, [[x_N/y_N]])$. $[[\vec{x}]]/[[\vec{y}]]$ is also referred to as a value obtained by dividing $[[\vec{x}]]$ by $[[\vec{y}]]$.

[Logical Operation]

Not $[[x]]$ based on secure computation uses $[[x]]$ as inputs, and outputs $[not(x)]$. The logical product and ($[[x]]$, $[[y]]$) by the secure computation uses $[[x]]$, $[[y]]$ as inputs, and outputs $[[and (x, y)]]$. The logical sum or ($[[x]]$, $[[y]]$) by secure computation uses $[[x]]$, $[[y]]$ as inputs and outputs

[[or (x, y)]]. An exclusive OR xor([[x]], [[y]]) by secure computation uses [[x]], [[y]] as inputs and outputs [[xor(x, y)]].

The logical operation can be easily configured by combining addition, subtraction, multiplication, and division.

[Comparison Operation]

The equal sign determination=([[x]], [[y]]) (sometimes represented as equal ([[x]], [[y]])) by secure computation uses [[x]], [[y]] as inputs, and outputs [[1]] when x=y, and outputs [[0]] otherwise. The comparison <([[x]], [[y]]) by secure computation uses [[x]], [[y]] as inputs, and outputs [[1]] when x<y, and [[0]] otherwise. The comparison by secure computation >([[x]], [[y]]) uses [[x]], [[y]] as inputs, and outputs [[1]] when x>y, and [[0]] otherwise. The comparison ≤([[x]], [[y]]) by secure computation uses [[x]], [[y]] as inputs, and outputs [[1]] when x≤y, and outputs [[0]] otherwise. The comparison ≥([[x]], [[y]]) by secure computation uses [[x]], [[y]] as inputs, and outputs [[1]] when x≥y, and outputs [[0]] otherwise.

The comparison operation can be easily configured by combining logical operations.

[Secure Sorting]

The secure sorting uses the share $[[\vec{x}]]$ of the N-dimensional vector $\vec{x}=(x_1, \ldots, x_N)$ as inputs, and outputs a vector sort $([[\vec{x}]]):=([[x_{i\_1}]], \ldots, [[x_{i\_N}]])$ (where $x_{i\_1}, \ldots$, and $x_{i\_N}$ satisfy $x_{i\_1} \le x_{i\_2} \le \ldots \le x_{i\_N}$) obtained by sorting the elements $[[x_1]], \ldots, [[x_N]]$ of $[[\vec{x}]]$ in ascending order. For a table T in which each element of any attribute is concealed, a table in which the table T is subjected to secure sorting with the attribute a of the table T as a key is a table exchanged record by record so that the values of the elements of the attribute a are in ascending order from the first record.

As a specific method of secure sorting, there is a method described in Reference Non Patent Literature 5.

(Reference Non Patent Literature 5: Hiroshi Igarashi, Hiroki Hamada, Ryo Kikuchi, Koji Chida, "A Design and an Implementation of Super-High-Speed Multi-Party Sorting: The Day When Multi-Party Computation Reaches Scripting Languages", Computer Security Symposium (CSS), 2017.)

[Secure Unique Check]

The secure unique check uses the share $[[\vec{x}]]$ of the N-dimensional vector $\vec{x}=(x_1, \ldots, x_N)$ as an input, and outputs a vector unique check $([[\vec{x}]]):=([[x_{i\_1}]], [[x_{i\_N}]])$ (where $x_{i\_1}, \ldots, x_{i\_N}$ are either 1 or 0) substituted with [[1]] for the element that appears in the first time and [[0]] for the elements that appear in the second and subsequent times when the same value appears twice or more in the elements $[[x_1]], \ldots, [[x_N]]$ of $[[\vec{x}]]$. For example, executing the secure unique check on the vector ([[1]], [[2]], [[2]], [[3]], [[3]], [[3]]) results in ([[1]]1, [[1]], [[0]], [[1]], [[0]], [[0]]).

The secure unique check can be easily configured by combining secure sorting and comparison operation.

[Group-by Operation]

The Group-by operation is an operation for obtaining a statistical value (for example, average height for each gender) grouped for each value of an element of a key attribute in a case where a table has a key attribute (for example, gender) and a value attribute (for example, height) and each element of any attribute of the table is concealed. A case in which the computed statistical value is a sum is a groupBySum operation, and a case in which the computed statistical value is a frequency is a groupByCount operation.

FIG. 1 is a diagram illustrating an example of groupBySum operation. As can be seen from the example of FIG. 1, in the table representing the result of the groupBySum operation, the values of the elements of the key attribute are arranged in ascending order from the first record, and the sum of the elements of the value attribute 1 and the sum of the elements of the value attribute 2 are obtained for each value of the element of the key attribute. FIG. 2 is a diagram illustrating an example of groupByCount operation. As can be seen from the example of FIG. 2, in the table representing the result of the groupByCount operation, the values of the key attribute are arranged in ascending order from the first record, and the number of the elements of the value attribute 1 and the number of the elements of the value attribute 2 are obtained for each value of the element of the key attribute.

As a specific method of Group-by operation, there is a method described in Reference Non Patent Literature 6.

(Reference Non Patent Literature 6: Ryo Kikuchi, Koki Hamada, Dai Ikarashi, Gen Takahashi, Katsumi Takahashi, "Oudanteki dousen bunseki wo himitsu keisan de yattemiyou (Let's Conduct Cross-Sectional Traffic Line Analysis by Secure Computation)", 2020 Symposium on Cryptography and Information Security, 3C2-1, 2020.)

In the Group-by operation disclosed in Reference Non Patent Literature 6, various Group-by operations are efficiently performed by using a groupByCommon operation.

<<k-Means Method>>

The k-means method is one of machine learning methods classified as unsupervised learning. In supervised learning such as regression analysis and class classification, desired output (called training data) is prepared, and its object is to construct a model that reproduces the output with high accuracy, whereas in unsupervised learning such as clustering, desired output is not determined in advance.

In clustering, distances between a plurality of pieces of given data are computed, and pieces of data having close distances are put together into clusters as similar data. The clustering includes a non-hierarchical method in which the number of clusters to be generated is determined in advance, such as the k-means method, and a hierarchical method in which the number of clusters to be generated is not determined in advance and clusters are sequentially formed from the most similar pieces of data (that is, pieces of data having a minimum distance). The k-means method has a feature that the amount of calculation is less likely to increase even when large-scale data is clustered as compared with the hierarchical method, and thus, is often used for data of a scale that cannot be handled by the hierarchical method.

The flow of processing in the k-means method is as follows.

(1) The number K of clusters to be generated and M pieces of data to be clustered are input. Each data is represented by an N-dimensional vector. Each dimension represents a feature amount of data.

(2) The initial values of the K centroids are set. Here, the centroid is a centroid of data included in the cluster. As a method of setting an initial value, there are a Forgy method, in which K pieces of data randomly selected from M pieces of data are set as centroids, and a k-means++ method.

(3) For each pair of data and centroid, the distance is computed. As the distance, for example, a Euclidean distance is used.

(4) A cluster having a minimum distance to the centroid is assigned to each data as a cluster to which the data belongs.

(5) For each cluster, a centroid is computed.

(6) When a predetermined end condition is satisfied, the cluster assignment result with respect to the data obtained in (4), that is, the information representing the cluster to which the data belongs is output, and in other cases, the processing of (3) to (5) is performed. The predetermined end condition is, for example, a condition of whether each of the K centroids has converged to a certain position, or a condition of whether the number of executions of the processing of (3) to (5) has reached a predetermined number of times.

<<Secure k-Means Method>>

The secure k-means method is a method of performing secure computation of the k-means method, and the method is secure except for the number M of data and the number K of clusters. In a case where the convergence determination condition as described above is used as the end condition, it is necessary to decode one-bit information indicating "whether each of the K centroids has converged to a certain position" for each convergence determination, but all the other information is processed while being concealed. For example, the M pieces of data, the K pieces of centroids, the distance between the data and the centroid, the information indicating the cluster to which the data belongs, and the number of pieces of data included in the cluster are processed while being concealed.

Next, a table handled by the secure k-means method will be described. In the k-means method, it is necessary to handle information indicating a cluster to which data belongs. Here, as illustrated in FIG. 3, management is performed by using a table (hereinafter, referred to as a cluster ID table) in which data IDs of M pieces of data and cluster IDs of K clusters are associated on a one-to-one basis. It is assumed that all IDs are dispensed in order from 1. The M pieces of data are managed using a table (hereinafter, referred to as a data table) in which a data ID and data of the data ID are associated with each other as illustrated in FIG. 4. The K centroids are managed using a table (hereinafter, referred to as a centroid table) in which a cluster ID and a centroid of a cluster of the cluster ID are associated with each other as illustrated in FIG. 5. Among the three tables, the data table is not rewritten in the middle of the processing, while the cluster ID table and the centroid table are appropriately rewritten.

The processing flow in the secure k-means method is the same as the processing flow in the k-means method, and is different only in whether secure computation is performed. The way of performing the processing of (3) to (5) using the above three tables will be described below.

[Calculation of Distance Between Data and Centroid]

Here, processing of (3) will be described. In the processing, the distance between the data of the data ID and the centroid of the cluster of the cluster ID is computed for all combinations of the data ID and the cluster ID using the data table and the centroid table. However, in order to facilitate the subsequent processing, the calculation results are summarized in a distance table as illustrated in FIG. 6.

[Assignment of Clusters]

Here, the processing of (4) will be described. In the processing, the cluster ID table is updated using the distance table obtained in the processing of (3) such that a cluster having the minimum distance to the centroid is paired with each data. That is, in the cluster ID table, the cluster ID paired with the data ID is the cluster ID of the cluster including the centroid having the minimum distance from the data of the data ID. For this purpose, a cluster ID of a cluster having the minimum distance to the data of the data ID for each data ID is extracted from the distance table. Specifically, the following processing is performed.

(4-1) The distance table is secure sorted by using the distance attribute as a key.

(4-2) The secure unique check is performed on the element column of the data ID attribute of the table generated in (4-1), and a table, in which the element column obtained as a result of the secure unique check is added to the table generated in (4-1) as the checked data ID attribute, is generated.

(4-3) Only records in which the value of the element of the checked data ID attribute of the table generated in (4-2) is equal to [[1]] are extracted, and a table including these records is generated.

(4-4) The table generated in (4-3) is subjected to secure sorting with the data ID attribute as a key.

A table obtained by extracting the element column of the data ID attribute and the element column of the cluster ID attribute from the table generated in (4-4) is a cluster ID table in which a cluster having the minimum distance to the centroid for each data is paired.

[Calculation of Centroid]

Here, the processing of (5) will be described. In this process, the centroid table is updated using the cluster ID table obtained in the processing of (4). The centroid is an average of data included in each cluster. Therefore, if the sum of data included in the cluster and the number of data included in the cluster can be obtained for each cluster, the centroid can be obtained. Since each data is expressed as a vector, the centroid can be efficiently obtained by using the groupBySum operation and the groupByCount operation. Specifically, the following processing is performed.

(5-1) The element column of the cluster ID attribute of the cluster ID table is extracted, and the element column of the data ID attribute of the data table is replaced with the element column.

(5-2) The groupBySum operation is performed on the table generated in (5-1) using the data ID attribute as a key.

(5-3) The groupByCount operation is performed on the table generated in (5-1) using the data ID attribute as a key.

(5-4) A value obtained by dividing the value of the element of the data attribute of each record of the table generated in (5-2) by the value of the element of the data attribute of each record of the table generated in (5-3) is obtained.

The value obtained in (5-4) is the centroid of each cluster.

As can be seen from the above description, by performing cluster assignment using secure sorting and secure unique check and performing centroid calculation using groupBySum operation and groupByCount operation, it is possible to safely and efficiently perform secure computation of the k-means method.

First Embodiment

Figure 8:
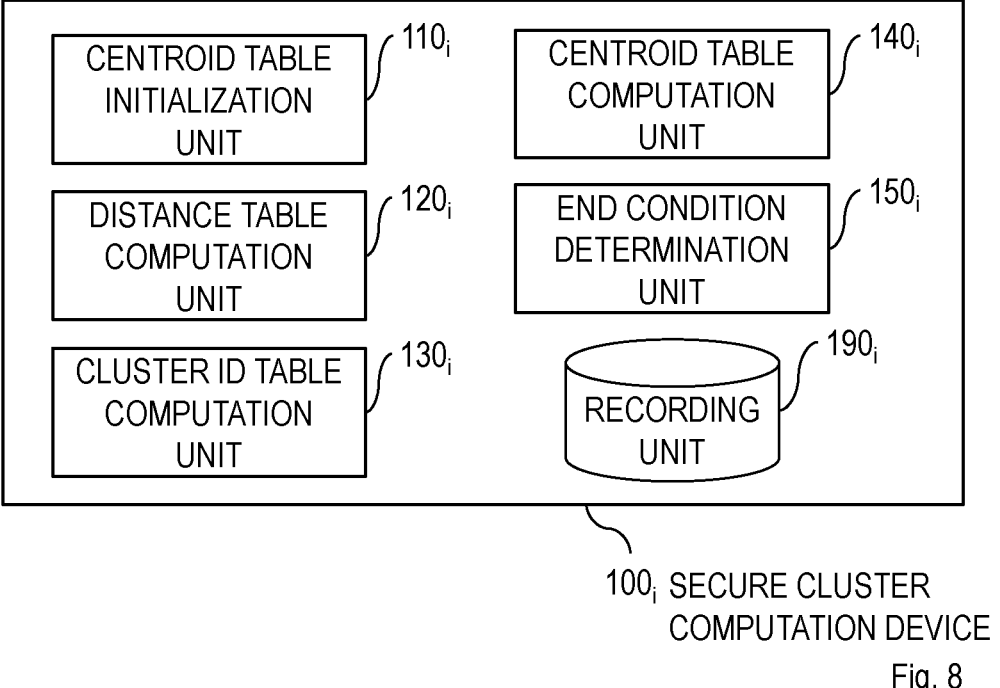
FIG. 8 is a block diagram illustrating a configuration of a secure cluster computation device 100$_i$.
Figure 9:
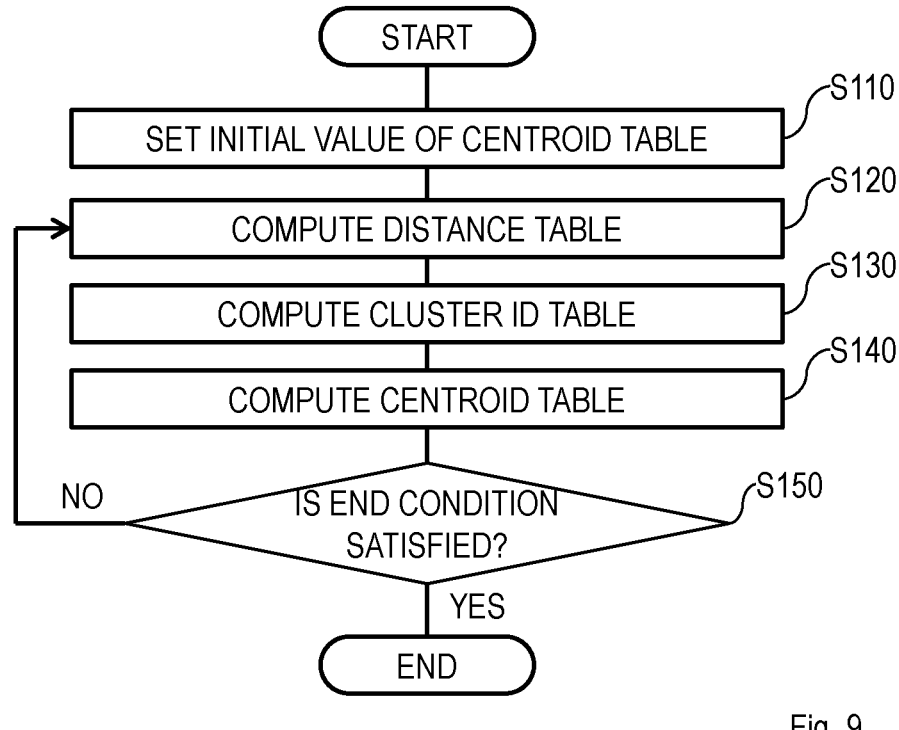
FIG. 9 is a flowchart illustrating operation of the secure cluster computation system 10.

The secure cluster computation system 10 will be described below with reference to FIGS. 7 to 9. FIG. 7 is a block diagram illustrating a configuration of the secure cluster computation system 10. The secure cluster computation system 10 includes W (W is a predetermined integer equal to or greater than 3) secure cluster computation devices $100_1, \ldots, 100_W$. The secure cluster computation devices $100_1, \ldots, 100_W$ are connected to the network 800 and can communicate with each other. The network 800 may be, for example, a communication network such as the Internet, a broadcasting channel, or the like. FIG. 8 is a block diagram illustrating a configuration of a secure cluster computation device $100_i$ ($1 \le i \le W$). FIG. 9 is a flowchart illustrating operation of the secure cluster computation system 10.

As illustrated in FIG. 8, the secure cluster computation device 100$_i$ includes a centroid table initialization unit 110$_i$, a distance table computation unit 120$_i$, a cluster ID table computation unit 130$_i$, a centroid table computation unit 140$_i$, an end condition determination unit 150$_i$, and a recording unit 190$_i$. Each component of the secure cluster computation device 100$_i$ except for the recording unit 190$_i$ is configured to be able to execute operation required for secure computation, that is, operation required for achieving the function of each component among at least concealment, addition, subtraction, multiplication, division, logical operation (NOT, logical product, logical sum, exclusive logical sum), comparison operation (=, <, >, ≤, ≥), secure sorting, secure unique check, and Group-by operation. As a specific functional configuration for achieving each operation in the present invention, for example, a configuration capable of executing an existing algorithm including the algorithms disclosed in each of Reference Non Patent Literatures 1 to 6 is sufficient, and since these are conventional configurations, a detailed description thereof will be omitted. The recording unit 190$_i$ is a component that records information necessary for the processing of the secure cluster computation device 100$_i$. For example, the recording unit 190$_i$ records a data table representing data to be clustered in advance.

Through cooperative calculation by the W secure cluster computation devices 100$_i$, the secure cluster computation system 10 achieves secure computation of the k-means method that is a multi-party protocol. Therefore, the centroid table initialization means 110 (not illustrated) of the secure cluster computation system 10 is configured by the centroid table initialization units 110$_1$, . . . , 110$_W$, the distance table computation means 120 (not illustrated) is configured by the distance table computation units 120$_1$, . . . , 120$_W$, the cluster ID table computation means 130 (not illustrated) is configured by the cluster ID table computation units 1301, . . . , 130$_W$, the centroid table computation means 140 (not illustrated) is configured by the centroid table computation units 140$_1$, . . . , 140$_W$, and the end condition determination means 150 (not illustrated) is configured by the end condition determination units 150$_1$, . . . , 150$_W$.

The secure cluster computation system 10 sets M (M is an integer of 1 or more) as the number of data, K (K is an integer of 1 or more) as the number of clusters, N (N is an integer of 1 or more) as a dimension of data, $(x_{i1}, . . . , x_{iN})$ (i=1, . . . , M) as data of the data ID i, and calculates a share $[[k(i)]]$ of a cluster ID k(i) (where k(i) satisfies 1≤k(i)≤K) of a cluster to which the data of the data ID i belongs from shares $([[x_{i1}]], . . . , [[x_{iN}]])$ (i=1, . . . , M) of M pieces of data $(x_{i1}, . . . , x_{iN})$ Here, it is assumed that a cluster ID table includes a data ID and a cluster ID of a cluster to which data of the data ID belongs as attributes (hereinafter, referred to as a data ID attribute and a cluster ID attribute), a data table includes a data ID and data of the data ID as attributes (hereinafter, referred to as a data ID attribute and a data attribute), a centroid table includes a cluster ID and a centroid of a cluster of the cluster ID as attributes (hereinafter, referred to as a cluster ID attribute and a centroid attribute), a distance table includes a data ID, a cluster ID, and a distance between data of the data ID and a centroid of a cluster of the cluster ID as attributes (hereinafter, referred to as a data ID attribute, a cluster ID attribute, and a distance attribute), and the data table includes a set of a share $[[i]]$ of the data ID i and the share $([[x_{i1}]], . . . , [[x_{iN}]])$ of the data $(x_{i1}, . . . , x_{iN})$ of the data ID i as the i-th record (i=1, . . . , M).

The operation of the secure cluster computation system 10 will be described with reference to FIG. 9.

In S110, the centroid table initialization means 110 sets a table including a set of a share $[[j]]$ of a cluster ID j and a share $([[c_{j1}]], . . . , [[c_{jN}]])$ of a centroid $(c_{j1}, . . . , c_{jN})$ of the cluster ID j (where the shares are computed by a predetermined method) as the j-th record (j=1, . . . , K) as an initial value of the centroid table. For example, the centroid table initialization means 110 randomly selects shares $[[i_1]]$, . . . , $[[i_K]]$ of the data IDs from among the shares $[[1]]$, . . . , $[[M]]$, and sets a set of the share $[[j]]$ of the cluster ID j and the share $([[x_{i\_j1}]], . . . , [[x_{i\_jN}]])$ of the data $(x_{i\_j1}, . . . , x_{i\_jN})$ of the data ID $i_j$ as an initial value of the j-th record (j=1, . . . , K) of the centroid table.

In S120, using the data table and the centroid table, the distance table computation means 120 computes a distance table including a set of the share $[[i]]$ of the data ID i, the share $[[j]]$ of the cluster ID j, a share $[[d_{ij}]]$ of a distance $d_{ij}$ between the data $(x_{i1}, . . . , x_{iN})$ of the data ID i and the centroid $(c_{j1}, . . . , c_{jN})$ of the cluster ID j as an M(j−1)+i-th record (i=1, . . . , M, j=1, . . . , K). The centroid table computed in S110 is used at the time of the first execution of S120, and the centroid table computed in S140 is used at the time of the second and subsequent executions.

In S130, the cluster ID table computation means 130 computes a cluster ID table including a set of the share $[[i]]$ of the data ID i and the share $[[k(i)]]$ of the cluster ID k(i) of the cluster to which the data of the data ID i belongs as the i-th record (i=1, . . . , M) using the distance table. For example, the cluster ID table computation means 130 computes a first intermediate table by performing secure sorting on the distance table by using the distance attribute of the distance table as a key, using the distance table, computes a second intermediate table by adding a column obtained by performing secure unique check on an element column of the data ID attribute of the first intermediate table to the first intermediate table as a checked data ID attribute, using the first intermediate table, computes a third intermediate table including a record in which a value of an element of the checked data ID attribute of the second intermediate table is $[[1]]$, using the second intermediate table, and computes a cluster ID table by respectively using, as an element column of the data ID attribute and an element column of the cluster ID attribute of the cluster ID table, an element column of the data ID attribute and an element column of the cluster ID attribute of a table obtained by performing secure sorting on the third intermediate table by using the data ID attribute of the third intermediate table as a key, using the third intermediate table. Here, the first intermediate table is a table including the data ID attribute, the cluster ID attribute, and the distance attribute, the second intermediate table is a table including the checked data ID attribute, the data ID attribute, the cluster ID attribute, and the distance attribute, and the third intermediate table is a table including the checked data ID attribute, the data ID attribute, the cluster ID attribute, and the distance attribute. The first intermediate table includes MK records, the second intermediate table includes MK records, and the third intermediate table includes M records.

In S140, the centroid table computation means 140 computes the centroid table using the data table and the cluster ID table. For example, the centroid table computation means 140 computes a fifth intermediate table by replacing the element column of the data ID attribute of the data table with the element of the cluster ID attribute of the cluster ID table, using the data table and the cluster ID table, computes a sixth intermediate table by a groupBySum operation using the data ID attribute of the fifth intermediate table as a key, using the fifth intermediate table, computes a seventh intermediate table by a groupByCount operation using the data ID attribute of the fifth intermediate table as a key, using the fifth intermediate table, and computes a centroid table by setting a value obtained by dividing the value of the element of the data attribute of the j-th record of the sixth intermediate table by the value of the element of the data attribute of the j-th record of the seventh intermediate table as a value of an element of the centroid attribute of the j-th record of the centroid table, using the sixth intermediate table and the seventh intermediate table. Here, the fifth intermediate table is a table including the data ID attribute and the data attribute, the sixth intermediate table is a table including the data ID attribute and the data attribute, and the seventh intermediate table is a table including the data ID attribute and the data attribute. The fifth intermediate table includes M records, the sixth intermediate table includes K records, and the seventh intermediate table includes K records.

In S150, the end condition determination means 150 ends the process in a case where a predetermined end condition is satisfied, and returns to the processing of S120 in other cases. That is, the secure cluster computation system 10 repeats the processing of S120 to S140. When the predetermined end condition is the number of executions of the processing of S120 to S140, it is assumed that the share [[T]] of the number of executions T is given in advance, and the centroid table initialization means 110 initializes the value of the counter t with the share [[0]]. Then, the end condition determination means 150 may update the value of the counter t with t+[[1]], and in a case where the value of =([[t>T]], [[1]]) is [[1]], the process may be ended, and in other cases, the process may return to the processing of S120.

According to the embodiment of the present invention, it is possible to perform secure computation of the k-means method with high accuracy while keeping data secure.

Supplement

Figure 10:
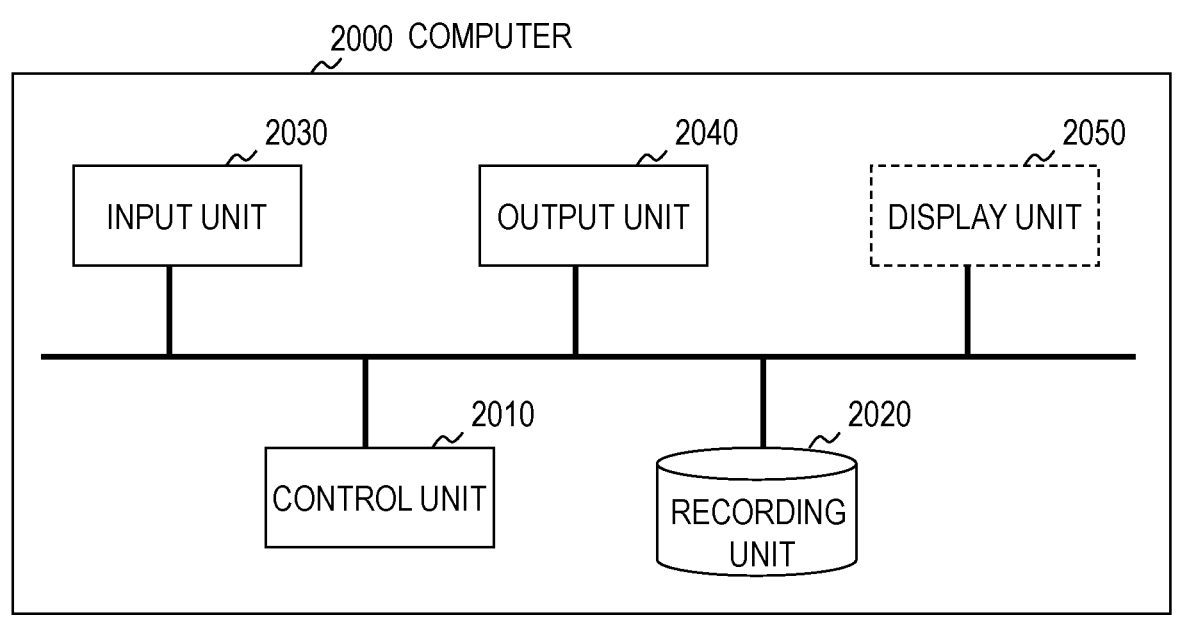
FIG. 10 is a diagram illustrating an example functional configuration of a computer that implements each device according to an embodiment of the present invention.

FIG. 10 is a diagram illustrating an example of a functional configuration of a computer that implements each device described above. It is possible to perform the processes in the respective devices described above, by causing a recording unit 2020 to read a program for causing a computer to function as the respective devices described above and causing a control unit 2010, an input unit 2030, an output unit 2040, and the like to operate.

The device according to the present invention includes, as a single hardware entity for example, an input unit that can be connected to a keyboard or the like, an output unit that can be connected to a liquid crystal display or the like, a communication unit that can be connected to a communication device (e.g., a communication cable) capable of communicating with the outside of the hardware entity, a CPU (Central Processing Unit, which may include a cache memory or a register), a RAM or a ROM which is a memory, an external storage device as a hard disk, and a bus that connects the input unit, the output unit, the communication unit, the CPU, the RAM, the ROM, and the external storage device so that data can be exchanged therebetween. A device (drive) or the like that can write and read data in and from a recording medium such as a CD-ROM may be provided in the hardware entity as necessary. Examples of a physical entity including such a hardware resource include a general-purpose computer.

The external storage device of the hardware entity stores a program required to implement the above-described functions, data required to process the program, and the like (the present invention is not limited to the external storage device and the program may be stored, for example, in a ROM which is a read-only storage device). Data or the like obtained by processing the program is appropriately stored in a RAM, an external storage device, or the like.

In the hardware entity, each program stored in the external storage device (or ROM or the like) and data required to process each program are read to a memory as necessary and are appropriately interpreted and processed by the CPU. As a result, the CPU implements a predetermined function (each component represented as . . . unit, . . . means, or the like).

The present invention is not limited to the above-described embodiment and can be appropriately modified without departing from the gist of the present invention. The processes described in the foregoing embodiment may be executed not only chronologically in accordance with the described order, but also in parallel or individually in accordance with the processing capability of a device that executes the processes or as necessary.

As described above, when the processing function of the hardware entity (the device according to the present invention) described in the foregoing embodiment is implemented by a computer, processing content of the function of the hardware entity is described by a program. In addition, as the computer executes the program, the processing function of the hardware entity is implemented on the computer.

The program in which the processing content is written may be recorded on a computer-readable recording medium. The computer-readable recording medium may be, for example, any recording medium such as a magnetic recording device, an optical disc, a magneto-optical recording medium, or a semiconductor memory. Specifically, for example, a hard disk device, a flexible disk, a magnetic tape, or the like, can be used as a magnetic recording device, a DVD (Digital Versatile Disc), a DVD-RAM (Random Access Memory), a CD-ROM (Compact Disc Read Only Memory), a CD-R (Recordable)/RW (ReWritable), or the like, can be used as an optical disk, an MO (Magneto-Optical disc), or the like, can be used as a magneto-optical recording medium, an EEP-ROM (Electronically Erasable and Programmable-Read Only Memory), or the like, can be used as a semiconductor memory.

In addition, the program is distributed by, for example, selling, transferring, or renting a portable recording medium such as a DVD or a CD-ROM on which the program is recorded. Further, a configuration may also be employed in which the program is stored in a storage device of a server computer and the program is distributed by transferring the program from the server computer to other computers via a network.

For example, a computer that executes such a program first temporarily stores a program recorded on a portable recording medium or a program transferred from the server computer in a storage device of the computer. In addition, to perform the processing, the computer reads the program stored in the storage device of the computer, and executes the processing in accordance with the read program. Also, in other modes of execution of the program, the computer may read the program directly from a portable recording medium and performs processing in accordance with the program, or alternatively, the computer may sequentially perform processing in accordance with a received program every time a program is transferred from the server computer to the computer. In addition, the above-described processing may be executed by a so-called ASP (Application Service Provider) type service that implements a processing function only by an execution instruction and result acquisition without transferring the program from the server computer to the computer. Note that the program in the present embodiment includes information that is used for processing by an electronic computer and is equivalent to the program (data or the like that is not a direct command to the computer but has property that defines processing performed by the computer).

Although the hardware entity is configured by causing a computer to execute a predetermined program in the present embodiment, at least some of the processing content may be implemented by hardware.

The invention claimed is:

1. A secure cluster computation system having M (M is an integer of 1 or more) as the number of data, K (K is an integer of 1 or more) as the number of clusters, N (N is an integer of 1 or more) as a dimension of data, and $(x_{i1}, \ldots, x_{iN})$ (i=1, . . . , M) as data of a data ID i, including three or more secure cluster computation devices, and configured to compute a share $((k(i)))$ of a cluster ID k(i) (where k(i) satisfies $1 \leq k(i) \leq K$) of a cluster to which the data of the data ID i belongs from shares $(((x_{i1})), \ldots, ((x_{iN})))$ (i=1, . . . , M) of M pieces of data $(x_{i1}, \ldots, x_{iN})$, wherein a table that includes a data ID and a cluster ID of a cluster to which data of the data ID belongs as attributes (hereinafter, referred to as a data ID attribute and a cluster ID attribute) is set as a cluster ID table, a table that includes a data ID and data of the data ID as attributes (hereinafter, referred to as a data ID attribute and a data attribute) is set as a data table, a table that includes a cluster ID and a centroid of a cluster of the cluster ID as attributes (hereinafter, referred to as a cluster ID attribute and a centroid attribute) is set as a centroid table, and a table that includes a data ID, a cluster ID, and a distance between data of the data ID and a centroid of a cluster of the cluster ID as attributes (hereinafter, referred to as a data ID attribute, a cluster ID attribute, and a distance attribute) is set as a distance table, the data table includes a set of a share $((i))$ of the data ID i and the share $(((x_{i1})), \ldots, ((x_{iN})))$ of the data $(x_{i1}, \ldots, x_{iN})$ of the data ID i as an i-th record (i=1, . . . , M), and the secure cluster computation system comprises:

centroid table initialization circuitry configured to set a table including a set of a share $((j))$ of a cluster ID j and a share $(((c_{j1})), \ldots, ((c_{jN})))$ of a centroid $(c_{j1}, \ldots, c_{jN})$ of the cluster ID j (where the shares are computed by a predetermined method) as a j-th record (j=1, . . . , K) as an initial value of the centroid table;

distance table computation circuitry configured to use the data table and the centroid table to compute a distance table including a set of the share $((i))$ of the data ID i, the share $((j))$ of the cluster ID j, a share $((d_{ij}))$ of a distance $d_{ij}$ between the data $(x_{i1}, \ldots, x_{iN})$ of the data ID i and the centroid $(c_{j1}, \ldots, c_{jN})$ of the cluster ID j as an M(j−1)+i-th record (i=1, . . . , M, j=1, . . . , K);

cluster ID table computation circuitry configured to compute a cluster ID table including a set of the share $((i))$ of the data ID i and the share $((k(i)))$ of the cluster ID k(i) of the cluster to which the data of the data ID i belongs as the i-th record (i=1, . . . , M) using the distance table; and centroid table computation circuitry configured to compute the centroid table using the data table and the cluster ID table.

2. The secure cluster computation system according to claim 1, wherein the cluster ID table computation circuitry configured to compute a first intermediate table by performing secure sorting on the distance table by using the distance attribute of the distance table as a key, using the distance table, compute a second intermediate table by adding a column obtained by performing secure unique check on an element column of the data ID attribute of the first intermediate table to the first intermediate table as a checked data ID attribute, using the first intermediate table, compute a third intermediate table including a record in which a value of an element of the checked data ID attribute of the second intermediate table is $((1))$, using the second intermediate table, and compute a cluster ID table by respectively using, as an element column of the data ID attribute and an element column of the cluster ID attribute of the cluster ID table, an element column of a data ID attribute and an element column of a cluster ID attribute of a table obtained by performing secure sorting on the third intermediate table by using the data ID attribute of the third intermediate table as a key, using the third intermediate table.

3. The secure cluster computation system according to claim 1, wherein the centroid table computation circuitry configured to compute a fifth intermediate table by replacing the element column of the data ID attribute of the data table with the element of the cluster ID attribute of the cluster ID table, using the data table and the cluster ID table, compute a sixth intermediate table by a groupBySum operation using the data ID attribute of the fifth intermediate table as a key, using the fifth intermediate table, compute a seventh intermediate table by a groupByCount operation using the data ID attribute of the fifth intermediate table as a key, using the fifth intermediate table, and compute a centroid table by setting a value obtained by dividing the value of the element of the data attribute of the j-th record of the sixth intermediate table by the value of the element of the data attribute of the j-th record of the seventh intermediate table as a value of an element of the centroid attribute of the j-th record of the centroid table, using the sixth intermediate table and the seventh intermediate table.

4. A secure cluster computation device included in a secure cluster computation system including three or more secure cluster computation devices, having M (M is an integer of 1 or more) as the number of data, K (K is an integer of 1 or more) as the number of clusters, N (N is an integer of 1 or more) as a dimension of data, and $(x_{i1}, \ldots, x_{iN})$ (i=1, . . . , M) as data of a data ID i, and configured to compute a share $((k(i)))$ of a cluster ID k(i) (where k(i) satisfies $1 \leq k(i) \leq K$) of a cluster to which the data of the data ID i belongs from shares $(((x_{i1})), \ldots, ((x_{iN})))$ (i=1, . . . , M) of M pieces of data $(x_{i1}, \ldots, x_{iN})$, wherein a table that includes a data ID and a cluster ID of a cluster to which data of the data ID belongs as attributes (hereinafter, referred to as a data ID attribute and a cluster ID attribute) is set as a cluster ID table, a table that includes a data ID and data of the data ID as attributes (hereinafter, referred to as a data ID attribute and a data table) is set as a data table, a table that includes a cluster ID and a centroid of a cluster of the cluster ID as attributes (hereinafter, referred to as a cluster ID attribute and a centroid attribute) is set as a centroid table, and a table that includes a data ID, a cluster ID, and a distance between data of the data ID and a centroid of a cluster of the cluster ID as attributes (hereinafter, referred to as a data ID attribute, a cluster ID attribute, and a distance attribute) is set as a distance table, the data table includes a set of a share ($(i)$) of the data ID i and the share ($((x_{i1})), \ldots, ((x_{iN}))$) of the data ($x_{i1}, \ldots, x_{iN}$) of the data ID i as an i-th record ($i=1, \ldots, M$), and the secure cluster computation device comprises:

a centroid table initialization circuitry configured to set a table including a set of a share ($(j)$) of the cluster ID j and a share ($(((c_{j1})), \ldots, ((c_{jN})))$) of a centroid ($c_{j1}, \ldots, c_{jN}$) of the cluster ID j (where the shares are computed by a predetermined method) as a j-th record ($j=1, \ldots, K$) as an initial value of the centroid table;

a distance table computation circuitry configured to use the data table and the centroid table to compute a distance table including a set of the share ($(i)$) of the data ID i, the share ($(j)$) of the cluster ID j, a share ($((d_{ij}))$) of a distance $d_{ij}$ between the data ($x_{i1}, \ldots, x_{iN}$) of the data ID i and the centroid ($c_{j1}, \ldots, c_{jN}$) of the cluster ID j as an M($j-1$)+i-th record ($i=1, \ldots, M, j=1, \ldots, K$);

a cluster ID table computation circuitry configured to compute a cluster ID table including a set of the share ($(i)$) of the data ID i and the share ($(k(i))$) of the cluster ID k(i) of the cluster to which the data of the data ID i belongs as the i-th record ($i=1, \ldots, M$) using the distance table; and a centroid table computation circuitry configured to compute the centroid table using the data table and the cluster ID table.

5. A non-transitory computer-readable storage medium which stores a program for causing a computer to function as the secure cluster computation device according to claim 4.

6. A secure cluster computation method, by a secure cluster computation system having M (M is an integer of 1 or more) as the number of data, K (K is an integer of 1 or more) as the number of clusters, N (N is an integer of 1 or more) as a dimension of data, and ($x_{i1}, \ldots, x_{iN}$) ($i=1, \ldots, M$) as data of a data ID i, and including three or more secure cluster computation devices, of computing a share ($(k(i))$) of a cluster ID k(i) (where k(i) satisfies $1 \le k(i) \le K$) of a cluster to which data of the data ID i belongs from shares ($((x_{i1})), \ldots, ((x_{iN}))$) ($i=1, \ldots, M$) of M pieces of data ($x_{i1}, \ldots, x_{iN}$), wherein a table that includes a data ID and a cluster ID of a cluster to which data of the data ID belongs as attributes (hereinafter, referred to as a data ID attribute and a cluster ID attribute) is set as a cluster ID table, a table that includes a data ID and data of the data ID as attributes (hereinafter, referred to as a data ID attribute and a data attribute) is set as a data table, a table that includes a cluster ID and a centroid of a cluster of the cluster ID as attributes (hereinafter, referred to as a cluster ID attribute and a centroid attribute) is set as a centroid table, and a table that includes a data ID, a cluster ID, and a distance between data of the data ID and a centroid of a cluster of the cluster ID as attributes (hereinafter, referred to as a data ID attribute, a cluster ID attribute, and a distance attribute) is set as a distance table, the data table includes a set of a share ($(i)$) of the data ID i and the share ($(((x_{i1})), \ldots, ((x_{iN})))$) of the data ($x_{i1}, \ldots, x_{iN}$) of the data ID i as the i-th record ($i=1, \ldots, M$), and the secure cluster computation method comprises:

a centroid table initialization step of setting a table including a set of a share ($(j)$) of a cluster ID j and a share ($(((c_{j1})), \ldots, ((c_{jN})))$) of a centroid ($c_{j1}, \ldots, c_{jN}$) of the cluster ID j (where the shares are computed by a predetermined method) as a j-th record ($j=1, \ldots, K$) as an initial value of the centroid table, by the secure cluster computation system;

a distance table computation step of using the data table and the centroid table to compute a distance table including a set of the share ($(i)$ of the data ID i, the share ($(j)$ of the cluster ID j, a share ($((d_{ij}))$) of a distance $d_{ij}$ between the data ($x_{i1}, \ldots, x_{iN}$) of the data ID i and the centroid ($c_{j1}, \ldots, c_{jN}$) of the cluster ID j as an M($j-1$)+i-th record ($i=1, \ldots, M, j=1, \ldots, K$), by the secure cluster computation system;

a cluster ID table computation step of computing a cluster ID table including a set of the share ($(i)$) of the data ID i and the share ($(k(i))$) of the cluster ID k(i) of the cluster to which the data of the data ID i belongs as the i-th record ($i=1, \ldots, M$) using the distance table, by the secure cluster computation system; and a centroid table computation step of computing the centroid table using the data table and the cluster ID table, by the secure cluster computation system.

* * * * *